(12) United States Patent
Boyer et al.

(10) Patent No.: US 7,238,329 B2
(45) Date of Patent: Jul. 3, 2007

(54) DEVICE FOR INJECTING A FLUID LOCATED BETWEEN TWO SUCCESSIVE BEDS TO SIMULTANEOUSLY PRODUCE AND DISTRIBUTE A POLYPHASE MIXTURE

(75) Inventors: Christophe Boyer, Charly (FR); Vincent Coupard, Vaulx en Velin (FR); Bertrand Fanget, Vienne (FR)

(73) Assignee: Institut Francais du Petrole, Cedex (FR)

( * ) Notice: Subject to any disclaimer, the term of this patent is extended or adjusted under 35 U.S.C. 154(b) by 814 days.

(21) Appl. No.: 09/930,152

(22) Filed: Aug. 16, 2001

(65) Prior Publication Data
US 2002/0020359 A1 Feb. 21, 2002

(30) Foreign Application Priority Data
Aug. 17, 2000 (FR) .................................. 00 10693

(51) Int. Cl.
*B01J 8/04* (2006.01)
*C10G 45/00* (2006.01)

(52) U.S. Cl. ...................... 422/194; 422/195; 422/190; 422/191; 422/220; 422/224; 208/209; 208/264; 208/254 H

(58) Field of Classification Search ................ 422/194, 422/195, 220, 224, 231, 188–191, 193, 207
See application file for complete search history.

(56) References Cited

U.S. PATENT DOCUMENTS 3,091,586 A * 5/1963 Pappas et al. .............. 208/210
3,880,961 A * 4/1975 Alcock ......................... 261/16
3,895,919 A * 7/1975 Forster et al. ............... 422/207
3,946,104 A    3/1976 Forster et al. ............... 423/659
5,755,960 A * 5/1998 Callebert et al. ......... 210/198.2
5,885,534 A    3/1999 Reynolds et al. ........... 422/220
5,997,826 A   12/1999 Lodeng et al. .............. 422/190
6,017,022 A    1/2000 Shirtum ....................... 261/75

FOREIGN PATENT DOCUMENTS

| DE | 687 952 | 2/1990 |
| EP | 0 442 164 A1 | 8/1991 |
| EP | 0 674 249 A1 | 9/1995 |
| EP | 782877 A1 * | 7/1997 |
| FR | 2 740 054 | 4/1997 |
| WO | WO 9619424 A1 * | 6/1996 |

* cited by examiner

*Primary Examiner*—Glenn Caldarola
*Assistant Examiner*—Jennifer A. Leung
(74) *Attorney, Agent, or Firm*—Millen, White, Zelano & Branigan, P.C.

(57) ABSTRACT

A device located between two successive granular beds (203) and (205) for injecting a secondary fluid can produce and distribute a polyphase mixture between said secondary fluid and a fluid or mixture of fluids originating from the upper granular bed and comprises a chamber for injecting a secondary fluid (201), the secondary fluid being injected into said device, and means (204) for bringing said secondary fluid into contact with at least a portion of the fluid or mixture of fluids originating from the upper granular bed (203) and for simultaneous distribution (208) of the mixture resulting from said contact to the lower granular bed (205).

11 Claims, 2 Drawing Sheets

DEVICE FOR INJECTING A FLUID LOCATED BETWEEN TWO SUCCESSIVE BEDS TO SIMULTANEOUSLY PRODUCE AND DISTRIBUTE A POLYPHASE MIXTURE

The present invention relates to a device located between two successive granular beds for injecting a secondary fluid that can optimise mixing between a plurality of fluids and distribution of said mixture, generally carried out between a liquid phase and a gas phase from the upper granular bed on the one hand, and an injected phase that is generally essentially gaseous and usually at least partially comprising hydrogen on the other hand. The invention also encompasses a liquid phase as the injected fluid. Such injection, mixing and distribution systems are generally integrated into a fixed bed reactor in which the fluid flow is in co-current dropper mode through said solid bed or beds of granular solid.

The present description will refer equally both to injection, mixing and distribution systems and to devices.

In particular, the present invention is applicable in all cases:
  where gas phases are in the majority with respect to the liquid phases, i.e., where the volume ratio between the gas and liquids is usually more than 3:1 and normally less than 400:1 (3<gas volume/liquid volume<400);
  where the gas phases are in the minority with respect to the liquid phases, i.e., where the volume ratio between the gas and liquids is usually more than 0.1:1 and normally less than 1:1 (0.1<gas volume/liquid volume<1);
  where the reaction is highly exothermic and requires the introduction of a supplementary fluid into the reactor, usually a gas, to cool the gas/liquid mixture;
  where the reaction necessitates close contact to dissolve a compound that is usually gaseous (for example hydrogen $H_2$) in the liquid phase.

The present invention is of particular application to gas/liquid quench systems or staged injection systems such as those used to implement hydrocracking, hydrotreatment, hydrodesulphurisation, hydrodenitrogenation, selective or complete hydrogenation of $C_2$ to $C_5$ cuts, selective hydrogenation of steam cracking gasoline, hydrogenation of aromatic compounds in aliphatic and/or naphthenic cuts, and hydrogenation of olefins in aromatic cuts.

It is also of application to carrying out other reactions requiring good mixing of a gas phase with a liquid phase, for example partial or complete oxidation reactions, amination, acetyloxidation, ammoxidation and halogenation reactions, in particular chlorination.

In the specific field of hydrodesulphurisation, hydrodenitrogenation and hydrocracking reactions to produce high conversions (to obtain a product containing, for example, 30 ppm (parts per million) of sulphur or less), the distribution of both gas and liquid must be good, but principally the liquid distribution must be good, as the volume ratios are generally between about 3:1 and about 400:1, usually between about 10:1 and about 200:1 when using a quench, very good contact between the introduced gas cools the process fluids.

The general solution proposed when the fluids to be distributed traverses a number of catalytic beds, consists of using staged injection systems of a gas feed between two successive catalytic beds traversed by a gas/liquid mixture.

U.S. Pat. Nos. 3,353,924, 3,855,068, 3,824,080 and 5,567,396 describe, for example, systems for staged injection of gas between two beds in which injection of the secondary gas, the secondary gas/primary flow mixture and distribution of the mixture are decoupled and are carried out successively. In contrast, in the devices described in the present application, the functions of injection, mixing and distribution of the two incident fluids are carried out simultaneously in the same system.

One of the advantages connected with the devices of the present invention is a substantial reduction in the volume required for these three operations. This gain in volume in the injection, mixing and distribution device has the advantage and consequence of increasing the volume in the reactor available for the beds of granular solids, said solids usually having a catalytic activity.

U.S. Pat. No. 4,235,847 describes a system in which two secondary injection stages are possible (one of gas and one of liquid). At the bed outlet, the gas/liquid flow is separated via a system of baffles. The liquid is collected at a plate with a diameter that is less than the diameter of the reactor and the gas is injected below this plate into the volume of liquid collected. The gas/liquid mixture (in the form of a mist) is then recovered from the top of tubes and injected into the bed through those tubes. That system integrates the function of gas/liquid mixing and distribution of the mixture at a single plate, but has the major drawback of limiting distribution to a diameter of less than the diameter of the plate because of the system of baffles. Further, the mixture is recovered from a single level in the conduits, that plate causes flexibility problems as regards the liquid flow. Finally, heat exchange occurs firstly from a gas to a gas and then from the resulting gas to a liquid. For the same interfacial area developed, there is thus a loss in gas/liquid heat transfer efficiency with respect to the case where the secondary gas (cold) is brought into direct contact with the liquid.

More precisely, the invention concerns a device for injecting a secondary fluid located between two successive granular beds to produce and distribute a polyphase mixture between the secondary fluid and a fluid or mixture of fluids originating from the upper granular bed. The device comprises a chamber for injecting a secondary fluid, said secondary fluid being injected into said device, and means for bringing said secondary fluid and at least a portion of the fluid or mixture of fluids originating from the upper granular bed into contact, and for simultaneous distribution of the mixture resulting from said contact to the lower granular bed.

In particular, said secondary fluid may be a gas phase at least partially comprised by hydrogen.

In a first implementation of the invention, said contact and distribution means are conduits (206) dedicated to passing the gaseous fraction of the fluid or fluid mixture originating from the upper granular bed (204). The conduits (206) traverse the chamber in a fluid tight manner, and in general they are longer than the maximum depth reached by the liquid level. Further, their upper portions are advantageously provided with a plate preventing flow of the liquid portion of the fluid or fluid mixture from the upper granular bed through said conduits.

In addition, the two types of conduits (204) and (206) advantageously extend a distance $h_t$ below the chamber.

In a further embodiment of the invention, said contact and distribution means are:
  conduits (222) allowing passage of the secondary fluid to the upper portion of said chamber, said portion usually being in the form of a plate;
  tubes or mixer channels (224) traversing the chamber in a fluid tight manner, the upper portions of which are provided with orifices for the passage of a mixture of secondary fluid and at least a portion of the fluid or mixture of fluids issuing from the upper granular bed.

The mixer channels also advantageously extend below the chamber by a distance $h_r$.

The invention also concerns a fixed bed reactor comprising:
- at least one upper bed of granular solids;
- at least one device in accordance with the invention located downstream of said upper bed, to mix and distribute a secondary fluid and a fluid or mixture of fluids issuing from said bed;
- at least one bed of granular solids located downstream of said device;
- at least one separate line for injecting secondary fluid into the chamber of said device, said injection preferably being substantially perpendicular with respect to the axis of the reactor.

In this reactor, the liquid and gas phases usually circulate through the granular bed or beds in co-current dropper mode.

Preferably, said beds of granular solids comprise at least one granular solid with a catalytic activity.

More particularly, the devices and/or reactor described in the present application can be used in hydrodesulphurisation, selective hydrogenation or hydrodenitrogenation processes.

Other advantages and characteristics of the invention will become clear from the description below given by way of example.

Figure 2:
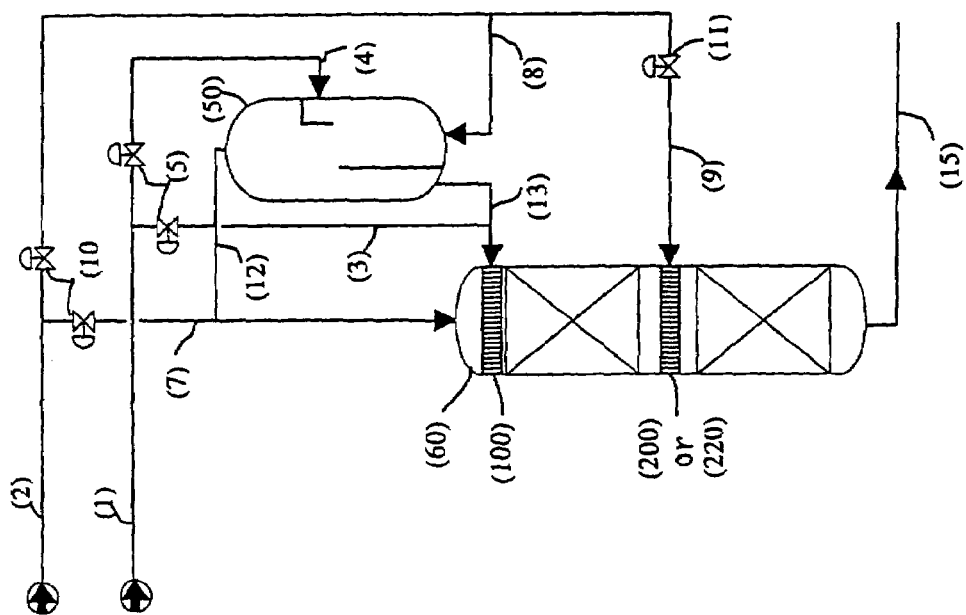
FIGS. 1 and 2 show two embodiments of a reactor that can incorporate the devices of the present invention.
Figure 1:
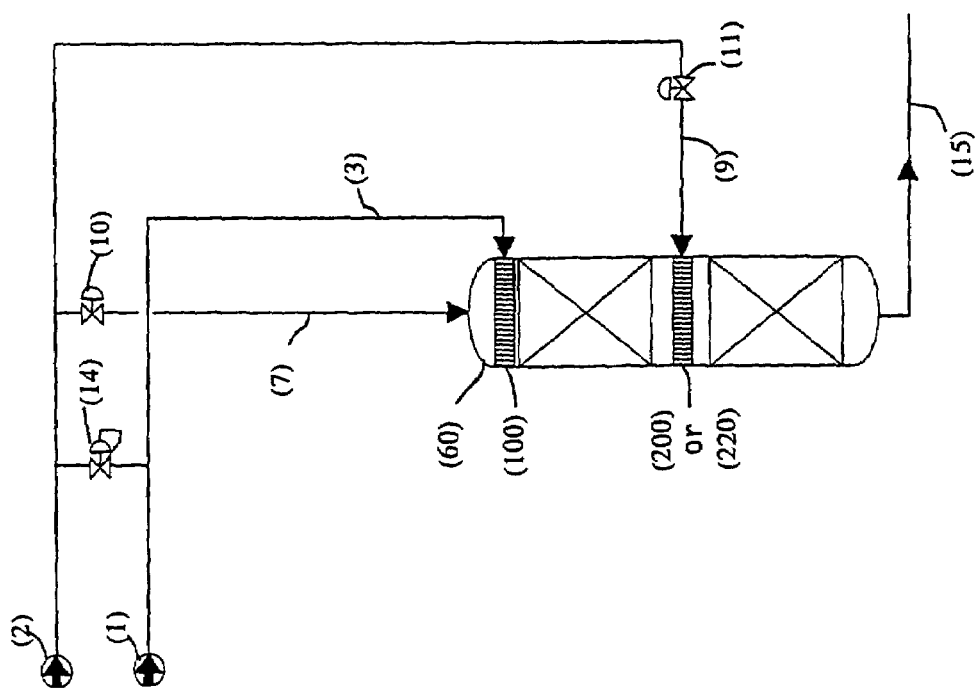

In one embodiment of the reactor of the invention, an internal distribution means (100) is located at the head of a fixed bed reactor functioning in dropper mode for liquid alone or a liquid/gas co-current. When the reactor operates in liquid/gas flow mode, the liquid feed and the gas feed are injected separately into the distribution means located at the head of the reactor and upstream of the first bed. A fraction of the gas injected into the reactor is injected into the reactor at an intermediate level between two successive beds via the injection, mixing and distribution system of the present invention. This first flow chart showing the distribution means of the present invention is shown in FIG. 1. Upstream of the reactor head, a drum can be added combined with a distribution system to optimise material exchange between the liquid phase and the gas phase (FIG. 2). This drum is outside the reactor. In this embodiment, the liquid feed and the gas feed are brought into contact by bubbling into this drum and leave the drum separately for separate injection into the reactor.

More precisely, reactor (60) shown in FIG. 1 is a fixed bed reactor with two superimposed beds that function in co-current dropper mode.

The liquid feed (1) is injected close to the head of the reactor into the distribution means (100) via line (3). This distribution means can be selected from any known mixing and/or distribution device. Advantageously, the distribution system at the head of the reactor is a device as described in the application filed by the Applicant on the same day as the present application.

The gas feed (2) is injected at two levels upstream of reactor (60): into the head of the reactor via line (7) and to an intermediate level of the reactor via line (9), via a distribution means (200 or 220) located between two successive beds. If the pressure in the distribution means (100) and in line (3) rises, a pressure compensation system (14) (composed of a regulating valve controlled by a differential pressure sensor) can evacuate a portion of the liquid flow to line (2) and the reactor head. The distribution of the gas flow injected into lines (7) and (9) is controlled using regulating valves (10) and (11). The gas flow injected into reactor (60) via line (7) is normally in the range 30 mole % to 70 mole % of the total molar flow rate of the gas injected into reactor (60); in line (9), this flow rate is in the range 30 mole % to 70 mole % of the total molar flow rate of the gas injected into reactor (60). Following the reaction, the product is recovered via line (15).

Reactor (60) shown in FIG. 2 is a fixed bed reactor with two superimposed beds that function in co-current dropper mode.

The liquid feed (1) is injected into the head of the reactor. The gas feed (2) is injected at two levels upstream of reactor (60): the head of the reactor via line (7) and to an intermediate level of the reactor via line (9), via a distribution means (200 or 220) located between two successive beds. To optimise material exchange between the gas feed and the liquid feed upstream of the reactor, a fraction of the gas feed injected overhead is injected via line (8) and a buffer drum (50). Distribution of the gas flow injected between lines (7), (8), (9) and (12) is controlled using regulating valves (10) and (11). The gas flow injected into reactor (60) via line (7) is normally in the range 0 mole % to 70 mole % of the total molar flow of the gas injected into reactor (60); the gas flow injected into reactor (60) via line (8) is normally in the range 0 mole % to 70 mole % of the total molar flow rate of the gas injected into reactor (60), and the gas flow rate injected via line (9) is in the range 30 mole % to 50 mole % of the total molar flow of the gas injected into reactor (60). At the reactor inlet, the liquid feed can be directly injected into the distribution means (100) located at the head of the reactor via line (3), or it can be injected via line (4) and buffer drum (50) prior to rejoining the distribution means (100) via line (13). Liquid flow via lines (3) and (4) is controlled by regulating valves (5). The fraction of the liquid feed flow injected into the reactor via line (4) is in the range 1% to 99% by weight of the total liquid flow injected into the reactor and the fraction of the flow of liquid feed injected into the reactor via line (3) is in the range 99% to 1% by weight of the total liquid flow rate injected into the reactor. After the reaction, the product is recovered via line (15).

For staged injection of the gas feed into the intermediate level between the beds, two embodiments have been proposed, which are illustrative and not limiting in nature. As an example, they can allow injection of a gas phase to the intermediate level of a fixed bed reactor functioning in dropper mode for liquid alone or a gas/liquid mixture. This system may be applied to staged injection of hydrogen into a selective hydrogenation reactor or into a gas oil fed hydrodesulphurisation reactor. The aim is also to carry out heat transfer by injecting the gas feed at a lower temperature than that of the principal flow in the reactor. The gas feed thus advantageously acts as a quench gas. The particular features of the staged injection systems proposed in the present invention is simultaneous integration of the function mixing the injected gas with the principal flow and the function of distributing the resulting mixture upstream of the lower bed.

Figure 4:
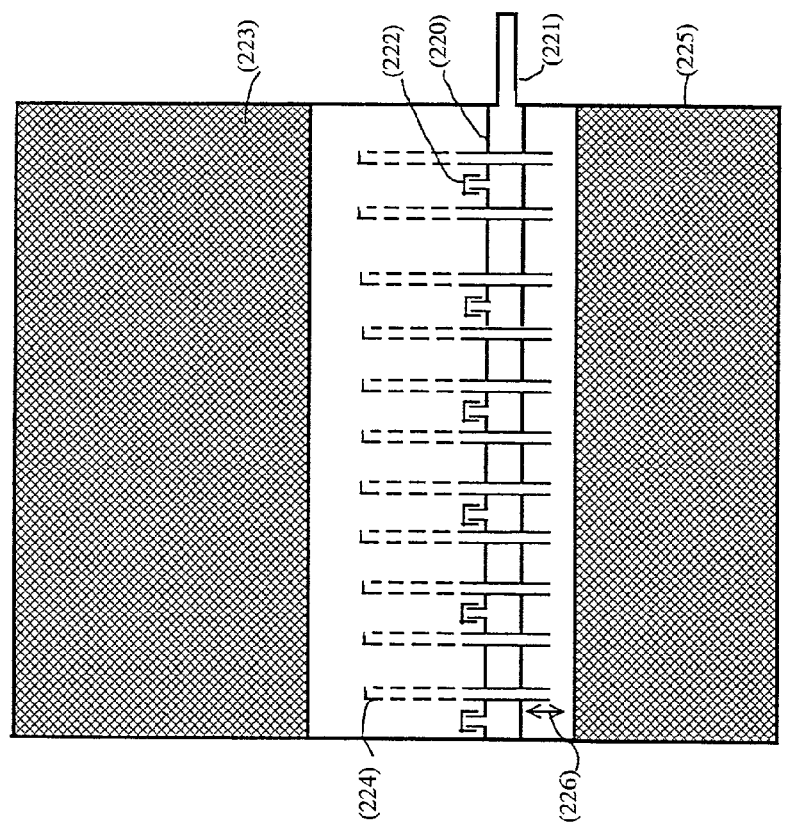
FIGS. 3 and 4 show two embodiments of the invention of a staged injection device or quench device functioning between two successive catalytic beds and capable of being located, for example, in one of the reactors shown in FIGS. 1 and 2.
Figure 3:
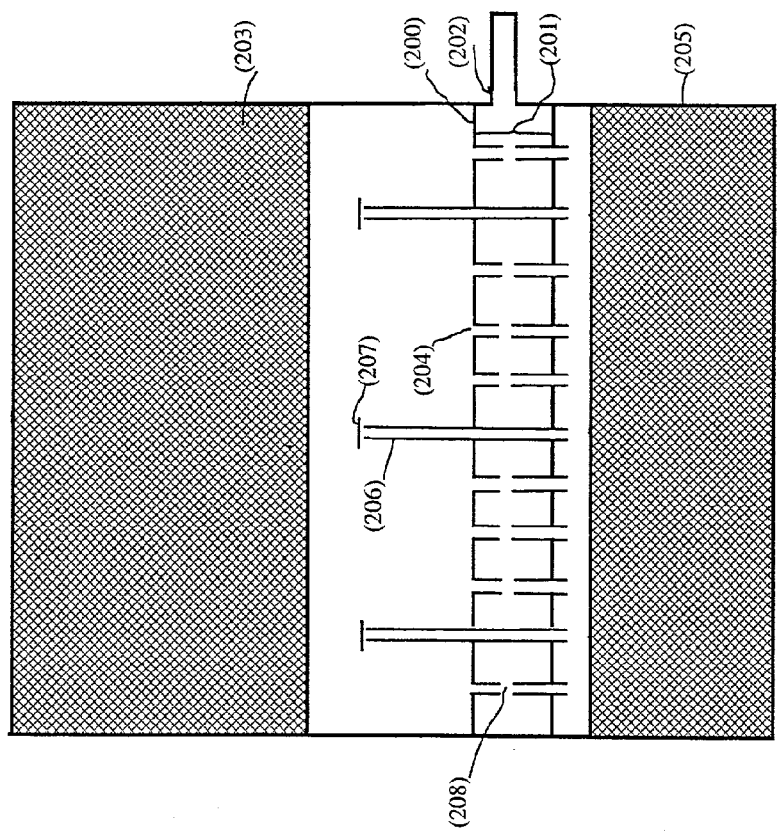

FIGS. 3 and 4 are diagrams of two different embodiments of such staged injection systems.

In FIG. 3, the fluid, normally comprising a mixed liquid/gas phase recovered from the upper bed (203) flows through conduits (204) that traverse a gas injection chamber (201) before being injected into the lower bed (205). These conduits (204) are in communication with the gas injection chamber (201) via orifices located on either side of each conduit. The injected gas will therefore mix into each injection conduit. The gas injection chamber is supplied by a lateral inlet (202). The gas pressure in the chamber (201) is at least equal to the pressure in the reactor increased by the hydrostatic pressure due to the level of the liquid above (200) and the pressure drop of the gas passing through holes (208).

The residual gas from the upper bed (203) is then evacuated through conduits (206) that traverse the gas injection chamber (201) in a fluid tight manner.

For the first staged gas injection system, described in FIG. 3, the principle consists of recovering the gas/liquid mixture from the upper bed (203) at the upper wall of chamber (201) where a liquid level is naturally established under gravity. The liquid flows through conduits (204) that traverse the lateral wall of the reactor at at least one point. The gas is then injected from this chamber (201) into the liquid flow via orifices (208) distributed in the walls of conduits (204). The gas/liquid mixture is thus produced in the conduits that correspond to points for injecting the mixture into the lower bed. The mixing and distribution functions are thus simultaneous. These conduits are thus advantageously provided with orifices (208) on the lateral walls to bring the injected gas into contact with the liquid flow. The conduits or mixer channels preferably have a substantially constant diameter throughout their axial length. The diameter of these conduits is calculated using any technique or method that is known to the skilled person so that the conduits are not filled with liquid. This diameter is generally in the range 5 mm to 50 mm. The diameter of the orifices is advantageously less than 30% of the diameter of the conduit so as to create a pressure drop for the liquid through these holes of more than 10 times more than the principal pressure drop through conduits (204). The number and diameter of these holes is calculated to create a pressure drop for the gas of more than $10^3$ Pa, preferably more than $5 \times 10^3$ Pa. The number of holes per conduit is usually in the range 2 to 6; their diameter is preferably in the range 0.5 to 15 mm. The difference in height between the levels of these holes is at least 30 mm. The depth of the gas injection chamber is generally in the range 100 to 300 mm. This depth has an impact on gas/liquid material exchange. The density of the conduits per square meter is normally at least 80 conduits/m$^2$ to ensure a distribution of the gas/liquid injection points at the head of the catalytic bed. This density is generally in the range 100 to 700 conduits/M$^2$, preferably in the range 150 to 500 conduits/m$^2$. Finally, conduits (204) advantageously extend below the gas injection chamber (201) by a distance $h_t$ to prevent a portion of the liquid from propagating along the lower outer surface of the chamber and to reduce the space between the mixture injection point and the inlet into the bed. The distance $h_t$ is usually in the range 10 to 50 mm. In order to avoid separating the liquid/gas mixture before it is injected into the bed, the distance between the bottom of the conduits (204) and the top of the bed is in the range 0 to 50 mm, 0 excluded, preferably in the range 0 to 20 mm, 0 excluded.

A second series of conduits (206), wherein the height with respect to the upper wall of chamber (201) is greater than the maximum value of the liquid depth, traverses the gas injection chamber in a liquid tight manner before opening upstream of the second bed. These conduits recover residual gas from the first bed to inject it in the direction of the second bed. The upper portions of these conduits are covered with a circular plate (207) with a diameter of about twice the diameter of the conduit (206) and located at a height (with respect to the upper extremity of the conduits) that is normally half the diameter of the conduits (206). The diameter of these conduits is in the range 5 to 50 mm. In principle, in the case of staged injection of gas into a fixed bed reactor, the quantity of gas injected into the head of the reactor is not in excess with respect to the stoichiometry of the molecules to be treated, the quantity of gas subsisting at the outlet from the bed (203) is thus low with respect to the quantity to be injected. The density of these conduits is thus at least half that of the density of the perforated conduits (204). These conduits extend below the gas injection chamber by the same amount $h_t$ to inject all the fluids into the lower bed at the same level.

In a further embodiment of the invention, the principle of operation of the mixer described in FIG. 4 consists of recovering the gas/liquid mixture from the upper bed (223) on a plate formed by the upper wall (220) of a gas injection chamber (221) where a liquid level is naturally established under gravity. The gas is injected into the injection chamber (221). It is then injected into the liquid volume retained by the plate through conduits (222).

The gas/liquid mixture then established above the plate is injected towards the lower bed (225) via tubes or mixer channels (224) that are provided with orifices in their upper portion immersed in the liquid and which traverse chamber (221) in a fluid tight manner. Finally, the mixer channels (224) advantageously extend below gas chamber (222) by a distance $h_t$ to prevent any of the liquid propagating along the lower outer surface of the chamber and to reduce the space between the mixture injection point and the inlet to the bed.

For the second staged gas injection system (220) described in FIG. 4, the principle consists of recovering the gas/liquid mixture from the upper bed (223) at the upper wall of chamber (220) where a liquid level is naturally established under gravity. The gas is injected through an injection chamber (221) and conduits (222) into the volume of liquid retained by the plate. The injection chamber is supplied via a lateral line (221) through the wall of the reactor at at least one point. In this system, the injected gas initially comes into contact with the liquid in the form of a bubble flow and then the injected gas/liquid mixture comes into contact with the residual gas from the upstream bed in the mixer channels (224). The pressure of the gas in the chamber (221) is at least equal to the pressure in the reactor increased by the hydrostatic pressure due to the level of liquid above the upper surface of (220) and the pressure drop of the gas passing through the injectors (222). The mixing function is thus reached in two steps. Further, the final gas/liquid mixture is produced at the level of the injection points into the lower bed, i.e., at the level of the mixer channels (224). The mixing and distribution functions are thus also simultaneous.

The diameter of the gas injection conduits (222) is in general in the range 1 to 50 mm, with a minimum height of 50 mm to prevent liquid from flowing into chamber (220) when the unit is stopped. These conduits are advantageously covered with a cap with a diameter in the range 1 to 2 times the diameter of the conduits, and a height about equal to the height of the conduit, while the space between the top of the conduit and the cap is at least equal to a quarter of the diameter of the conduit. The gas/liquid mixture established above the plate is injected towards the lower bed (225)

through tubes or mixer channels (224) that are provided with orifices in their upper portion immersed in the liquid and which traverse the chamber (220) in a fluid tight manner. The diameter of these tubes is calculated using any technique or method that is known to the skilled person so that the conduits are not filled with liquid. This diameter is in the range 5 mm to 50 mm. The diameter of the orifices is a maximum of 75% of the diameter of the tube and in the range 3 to 35 mm. The total surface area of the opening through these holes is at least equal to the cross section for passage of the channel. The number of holes is more than 2 and generally in the range 2 to 20. Preferably, these holes are distributed evenly over the lateral wall of the mixer channel with a minimum distance between the levels of 30 mm. The distance between the lower orifice of a channel and the upper plate of the chamber (221) is less than the height of the gas injection chambers (222). Finally, the mixer channels are advantageously extended by a distance $h_r$ (226) below the gas chamber (222) to prevent preferential passage of the liquid over the lower surface of the distributor plate and to reduce the space between the mixture injection point and the inlet into the bed. The distance $h_r$ is in the range 10 to 50 mm. In order to prevent separation of the liquid/gas mixture before its injection into the bed, the distance between the bottom of tubes (224) and the top of the bed is usually in the range 0 to 50 mm, 0 excluded and preferably in the range 0 to 20 mm, 0 excluded.

The density of conduits (224) per square meter is at least 80 conduits/m² to ensure distribution of the gas/liquid injection points at the head of the catalytic bed. This density is generally in the range 100 to 700 conduits/m², preferably in the range 150 to 500 conduits/m². The density of conduits (222) is in the range 0.3 to 1 time the density of the tubes or mixer channels (224). Advantageously and in accordance with the invention, the cold injected gas can act to quench the catalytic reaction.

The invention claimed is:

1. A device for injecting a secondary fluid located between two successive upper and lower granular beds to produce and distribute a polyphase mixture between said secondary fluid and a fluid or mixture of fluids originating from the upper granular bed, said device comprising an injection chamber for injecting a secondary fluid, contact apparatus for said secondary fluid and at least a portion of fluid or mixture of fluids originating from the upper granular bed, and distribution apparatus for simultaneous distribution of a mixture resulting from said contact to the lower granular bed, in which said contact and distribution apparatuses are conduits (204) with a substantially constant diameter along their axial length traversing said injection chamber and pierced with orifices (208) over their lateral wall, said device further comprising conduits (206) for the passage of a gaseous fraction of fluid or a fluid mixture originating from the upper granular bed, said conduits (206) traversing the chamber in a fluid tight manner and covered with a circular plate (207) preventing flow of a liquid fraction of the fluid or fluid mixture originating from the upper granular bed through said conduits, the height of conduits (206) being greater than the maximum height reached by liquid forming above plate (200) on the upper portion of the chamber.

2. A device according to claim 1, wherein the contact and distribution apparatuses extend below the chamber by a distance $h_r$.

3. A device according to claim 1, in which the distance between the bottom of the conduits (204) and the upper surface of the lower bed is in the range 0 to 50 mm, 0 excluded and the density of the conduits (204) is more than 80 per square meter.

4. A fixed bed reactor, comprising:
    at least one upper bed of granular solids;
    at least one lower bed of granular solids;
    at least one device for injecting a secondary fluid located between the upper and lower granular beds to produce and distribute a polyphase mixture between a secondary fluid and a fluid or mixture of fluids originating from the upper granular bed, said device comprising an injection chamber for injecting a secondary fluid, contact apparatus for said secondary fluid and at least a portion of fluid or mixture of fluids originating from the upper granular bed and distribution apparatus for simultaneous distribution of a mixture resulting from said contact to the lower granular bed, said lower bed being located downstream of said fluids;
    at least one separate line for injecting said secondary fluid into the injection chamber, said separate line being substantially perpendicular with respect to the vertical axis of the reactor, said device further comprising conduits (206) for the passage of a gaseous fraction of fluid or a fluid mixture originating from the upper granular bed, said conduits (206) traversing the chamber in a fluid tight manner, and having a plate (207) preventing flow of a liquid fraction of the fluid or fluid mixture originating from the upper granular bed through said conduits, the height of conduits (206) being greater than the maximum height reached by liquid forming above a plate (200) on the upper portion of the chamber.

5. A reactor according to claim 4, comprising means for circulating liquid and gas phases through the granular bed or beds in a co-current descending manner.

6. A reactor according to claim 4, wherein a bed or beds of granular solids comprise at least one catalytic granular solid.

7. A process comprising a hydrodesulphurisation, selective hydrogenation or hydrodenitrogenation reaction in a reactor according to claim 4.

8. A device for injecting a secondary gas, comprising, between two successive upper and lower granular beds,
    a chamber for injecting said secondary gas, crossed in a fluid tight manner by a first series of mixer channels (224), the upper part of said chamber forming a plate (220) obtaining a liquid level above this plate, said mixer channels (224) being pierced with orifices in their upper portion immersed in the liquid, a second series of conduits (222) for injecting secondary gas from said chamber into the liquid, and means for circulating liquid and gas phases through the granular bed or beds in a co-current descending manner, said device being able to produce and distribute a polynhase mixture between said secondary gas and a gas/liquid mixture originating from the upper granular bed.

9. A device according to claim 8, in which the distance between the bottom of the conduits (224) and the upper surface of the lower bed is in the range 0 to 50 mm, 0 excluded and the density of the conduits (224) is more than 80 per square meter.

10. A device according to claim 8, wherein the conduit (224) have a substantially constant diameter along their axial length traversing said injection chamber and pierced with orifices over their lateral wall.

11. A device for injecting a secondary fluid located between two successive upper and lower granular beds to produce and distribute a polyphase mixture between said secondary fluid and a fluid or mixture of fluids originating from the upper granular bed, said device comprising an injection chamber for injecting a secondary fluid, contact apparatus for said secondary fluid and at least a portion of fluid or mixture of fluids originating from the upper granular bed, and distribution apparatus for simultaneous distribution of a mixture resulting from said contact to the lower granular bed, said device further comprising conduits (206) for the passage of a gaseous fraction of fluid or a fluid mixture originating from the upper granular bed, traversing the chamber in a fluid tight manner, and having a plate (207) preventing flow of a liquid fraction of the fluid or fluid mixture originating from the upper granular bed through said conduits the height of said conduit (206) being greater than the maximum height reached by liquid forming above plate (200) on the upper portion of the chamber.

\* \* \* \* \*